Nov. 20, 1951     E. L. KELLER     2,575,715
LIGHTNING PROTECTOR FOR WATT-HOUR METERS
Filed June 13, 1946
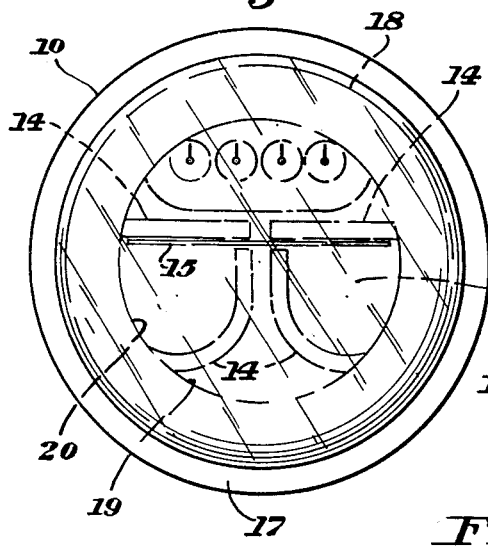
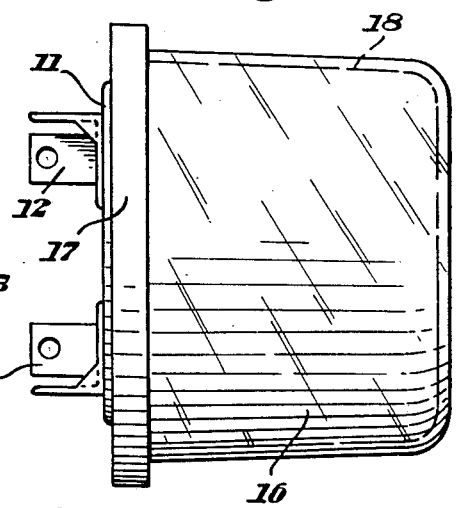
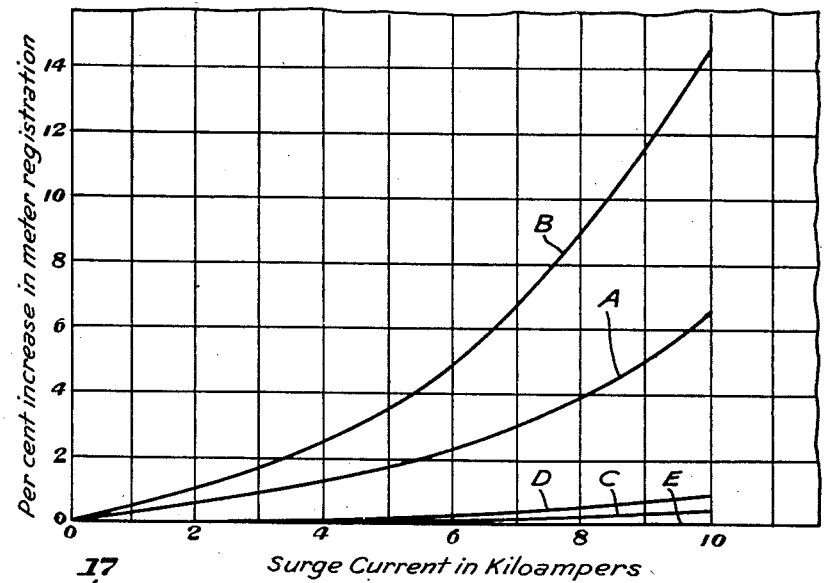
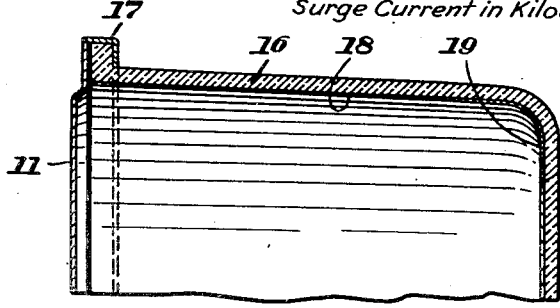
INVENTOR
Edward L. Keller Patented Nov. 20, 1951

2,575,715

UNITED STATES PATENT OFFICE 2,575,715

LIGHTNING PROTECTOR FOR WATT-HOUR METERS

Edward L. Keller, Mount Lebanon, Pa.

Application June 13, 1946, Serial No. 676,395

2 Claims. (Cl. 171—34)

This invention relates to watt-hour meters and, in particular, to means for preventing the demagnetization of the drag magnets thereof by surge currents resulting from lightning.

The routine testing of large numbers of watt-hour meters over an extended period of time, for accuracy of registration, has revealed that a small proportion of the meters in service run fast, i. e., indicate a power consumption greater than that which has actually occurred. This causes the customer to be overcharged. Extensive investigations in the field have shown that such inaccuracy is the result of demagnetization of the drag magnets caused by surge currents through the meter or an adjacent conductor. Such currents are frequently set up by lightning strokes. To prevent over-registration, meters are now usually provided with drag magnets specially adapted to limit demagnetization. Some meters, for example, have drag magnets composed of an alloy having a high coercive force. Limitations of mechanical design, however, prevent the replacement of drag magnets in meters already installed, and the cost of such replacement would be substantial if it were otherwise practical.

I have invented a novel lightning protector for watt-hour meters which is simple, inexpensive, and easily applicable to meters already in service as well as those of the latest design now being made. In a preferred embodiment, I provide a conducting shell adapted to enclose the entire meter. The shell is of low-resistance metal such as aluminum and is preferably of such size and shape as to fit snugly within the usual glass cover of a meter. When a lightning stroke occurs, or a surge current resulting therefrom, on the line to which the meter is connected or an adjacent conductor, the magnetic field set up by the current induces in the shell a current which creates an equal opposing field wholly neutralizing the external field and leaving the drag magnets of the meter unaffected. The efficacy of the protector is clearly shown by the results of tests in which meters are subjected to artificial surge currents of the order of those caused by lightning strokes. These results indicate a reduction in the meter error from about 15% to less than 1% when the protector of my invention is applied to one type of meter and an even greater reduction in the case of a different type of meter.

A complete understanding of the invention may be obtained from the following detailed description and explanation which refer to the accompanying drawings illustrating a preferred embodiment. In the drawings:

Figure 1 is a front elevation of a conventional watt-hour meter having the invention applied thereto;

Figure 2 is a side elevation;

Figure 3 is a partial section through the glass cover of the meter with the conducting shell seated therein; and Figure 4 is a set of curves showing the comparative effect of surge currents on meters with and without the invention applied thereto.

Referring in detail to the drawings, a conventional type of watt-hour meter indicated generally at 10 comprises a base 11 having terminals 12 projecting from the rear thereof and a movement 13 mounted thereon. The construction of this movement is well known and need not, therefore, be described except to refer to the drag magnets 14 which serve to check or damp the rotation of the disc armature 15.

An open-bottomed glass cover or bell 16 encloses the meter movement and is secured to the base 11 by a flanged ring 17. The ring has bent-in lugs adapted to cooperate with circumferentially spaced tongues integral with the base, on relative rotation therebetween. When the cover has been applied, it is sealed to the base in the known manner to prevent unauthorized tampering with the movement.

A metal shell or sheath 18 is placed over the movement before the cover is applied or, if more convenient, may be placed within the cover and applied simultaneously therewith. The shell is generally cylindrical with a slight taper and preferably fits snugly within the cover. The shell, like the cover, is open at the bottom. Its outer or upper end has an inturned flange 19 surrounding an opening or window 20 through which the meter movement and register dials may be viewed. The shell is composed of metal having a low electrical resistance such as aluminum. It may readily be spun from sheet stock of appropriate gage, e. g., 18–22, at low cost.

When a meter provided with a lightning protector such as that indicated at 18, is subjected to the magnetic field set up by a surge current resulting from lightning, a current is induced in the shell which induces a field in opposition to that of the external field, thereby neutralizing the effect of the latter and protecting all the meter parts particularly the drag magnets therefrom. This substantially prevents the demagnetization of the drag magnets as a result of lightning strokes which has been observed.

It will be understood that the exact shape and relative proportions of the protector shown in the drawings are suited only for one commercial type of watt-hour meter and will be varied as necessary, to permit installation on other existing types of meters. The protector may be applied exteriorly of the cover should that be desirable in some cases. Whether applied exteriorly or interiorly, it should preferably nest snugly with the cover 16. It may also be applied by sputtering a metallic layer on the interior or exterior of the cover.

Figure 4 shows the results of comparative tests on meters with and without the protector of my invention. Curve A shows the variation in the percent increase in the registration of a meter without my invention after surges of varying magnitudes up to 10,000 amperes. Curve B shows the percent increase after repetition of each surge 16 times. It will be observed that the repetition of the surges causes the maximum error to increase from about 7% to about 15%. The reason for repeating the surges a number of times is that a lightning discharge is an oscillatory phenomenon in which the current reverses several times before it finally dies away.

Curve C shows the change in registration of a meter equipped with my protector after single surges of varying magnitudes. Curve D shows the effect of a repetition of the surges 16 times. It will be noted that the maximum increase in registration is less than 1%. Curve E shows the results of a test on a meter equipped with a protector composed of material of slightly heavier gage than that used in the test represented in curves C and D. Even after repetition of the surge currents for 16 times, the meter showed no increase in registration, i. e., curve E is simply a straight line along the axis of the abscissa.

Tests on another type of meter without my protector showed a maximum increase in registration of about 37% after 16 surges of 10,000 amperes. The same type of meter equipped with my protector showed an increase in registration of less than ½ of 1% after 16 surges of the same magnitude.

It will be apparent from the foregoing that my invention provides a highly effective means for protecting the drag magnets of watt-hour meters from the demagnetizing effect of surges resulting from lightning strokes. In addition, the protector is simple, inexpensive and may be readily applied. It does not deteriorate in service and, therefore, lasts indefinitely. The protector has no effect on the calibration of the meter. It provides better protection, furthermore, than the use of an alloy having a high coercive force for the drag magnets. The protector also serves as a reflector and prevents deterioration of certain parts of the meter by radiations received in direct sunlight. As previously pointed out, the protector may be adapted for all existing designs of watt-hour meters having glass covers.

Although I have illustrated and described but a preferred embodiment of the invention, it will be recognized that changes in the details thereof may be made without departing from the spirit of the invention or the scope of the appended claims.

I claim:

1. In a watt-hour meter including a base having a register mechanism and drag magnets mounted thereon, and a generally cylindrical glass cover removably secured to said base and adapted entirely to enclose said magnets and register mechanism, the improvement comprising a generally cylindrical shell snugly fitting said cover, said shell being composed of a metal having electrical conductivity of the order of that of aluminum and thereby being effective to protect the drag magnets against demagnetization and prevent excessive registration of said mechanism as a result of surge currents in the neighborhood of the meter.

2. A surge protector for a watt-hour meter including a base having a register mechanism and drag magnets thereon enclosed within a glass bell secured to the base, said protector comprising a shell snugly fitting said bell, composed of a metal having electrical conductivity of the order of that of aluminum and thereby being effective to protect the drag magnets against demagnetization and prevent excessive registration of said mechanism as a result of surge currents in the neighborhood of the meter.

EDWARD L. KELLER.

REFERENCES CITED

The following references are of record in the file of this patent:

UNITED STATES PATENTS

| Number | Name | Date |
|---|---|---|
| 1,631,684 | Hoyle | June 7, 1927 |
| 1,667,656 | Dilzell | Apr. 24, 1928 |
| 1,706,537 | Mercier | Mar. 26, 1929 |
| 2,284,893 | Barnes | June 2, 1942 |